United States Patent [19]

Leonberger et al.

[11] 4,166,669

[45] Sep. 4, 1979

[54] PLANAR OPTICAL WAVEGUIDE, MODULATOR, VARIABLE COUPLER AND SWITCH

[75] Inventors: Frederick J. Leonberger; Joseph P. Donnelly, both of Carlisle, Mass.

[73] Assignee: Massachusetts Institute of Technology, Cambridge, Mass.

[21] Appl. No.: 796,787

[22] Filed: May 13, 1977

[51] Int. Cl.² .............................................. G02B 5/14
[52] U.S. Cl. .............................. 350/96.14; 350/356
[58] Field of Search ............. 350/96.13, 96.14, 160 R; 357/18-20

[56] References Cited
U.S. PATENT DOCUMENTS

| | | | |
|---|---|---|---|
| 3,795,434 | 3/1974 | Ash | 350/96.13 |
| 3,877,781 | 4/1975 | Kaminow | 350/96.14 |
| 3,976,358 | 8/1976 | Thompson | 350/96.13 |
| 4,002,997 | 1/1977 | Thompson | 357/18 |

*Primary Examiner*—John K. Corbin
*Assistant Examiner*—Stewart Levy
*Attorney, Agent, or Firm*—Arthur A. Smith, Jr.; Martin M. Santa

[57] ABSTRACT

A planar semiconductor optical waveguide, modulator, variable coupler and switch are described. The waveguide has an epitaxial layer on a semiconductor substrate. Two spaced strips of opposite conductivity type are implanted in the layer to form an optical waveguide channel in the space. By closely spacing two waveguide channels so that they have a common strip and a strip outside each channel, coupling is obtained between the channels. For a switch, the coupling length is such that substantially all the optical energy in the input channel is coupled to and emerges from the other channel. Reverse biasing one of the outside strips causes the optical energy to divide between the input channel and the output channel to provide output power modulation or variable coupling, and substantially complete transfer of power (switching) for a particular value of reverse bias.

29 Claims, 6 Drawing Figures

PLANAR OPTICAL WAVEGUIDE, MODULATOR, VARIABLE COUPLER AND SWITCH

The Government has rights in this invention pursuant to Contract #F19628-76-C-0002 awarded by the U.S. Air Force and the Defense Advanced Research Projects Agency.

BACKGROUND OF THE INVENTION

This invention relates to optical waveguides and particularly to a planar semiconductor waveguide capable of being switched.

The waveguide of this invention has been fabricated in GaAs with a $p^+n^-n^+$ structure and offers several advantages over striplines with $n^+$ ribs; the junction device waveguide of this invention has a comparable or lower optical loss, and additionally allows high electric fields at low leakage currents to be applied to the guide by reverse-biasing the $p^+n^-$ junction. This property facilitates the fabrication of modulators and switches using electro-optic effects. Prior-art Schottky-barrier devices, which do permit electro-optical effects, and prior-art proton-bombarded embedded strips have higher losses than the $p^+n^-n^+$ guides of this invention and low loss guides are required for integrated optical circuit (IOC) applications.

Switching in this invention was achieved using a technique in which the phase synchronism of the coupled guides is destroyed via the electro-optic effect. Prior-art devices is GaAs based on this scheme used planar films. A GaAs switch using metal-gap strip guides also has been reported; however, this device had only about 75% power transfer and there was significant power loss at switching biases.

The prior-art waveguide structures present difficulties in fabrication, quality of performance, or versatility. Structures having a rib profile are difficult to fabricate as low-loss devices due to scattering losses associated with rib edge roughness. Moreover, due to the tapered sides of the ribs that occur in practice, it is difficult to place the guides sufficiently near for coupling while maintaining the electrical isolation needed to make a good electro-optic switch. The channel guide, at least in semiconductor materials (which at present must be used for monolithic IOC structures due to the inability to form lasers in the dielectric and glass materials useful for discrete waveguide devices) are not suitable for electro-optic switches because of the inability of simultaneously achieve low-loss propagation and high electric fields. The metal-gap waveguide has potentially high propagation loss (due to a portion of mode being under the metal layer) which could affect both guide and switch performance.

It is therefore an object of this invention to provide an improved optical waveguide which is relatively easy to fabricate and has good transmission properties.

It is a further object of this invention to provide an optical waveguide which can be switched or modulated by an electrical signal.

It is a further object of this invention to provide electro-optic modulators, directional couplers (power splitters) and electro-optic waveguide switches by fabricating two or more waveguides of this invention in proximity on a semiconductor substrate.

Other objects and features of the invention will be made evident by the following detailed description when read in conjunction with the figures.

IN THE FIGURES

SUMMARY OF THE INVENTION

The optical waveguide of the invention is fabricated on a semiconductor substrate of one conductivity type, of refractive index $n_1$, on which is an epitaxial layer of refractive index $n_2$. Opposite conductivity-type impurities are implanted in the surface of the epitaxial layer to form spaced strips of refractive index $n_3$. The region above the epitaxial layer and strips has a refractive index $n_4$ and is generally air. The relative magnitude of the indices is given by $n_2 > n_3 \geq n_1 > n_4$. (It is also possible to have the profile $n_2 > n_1 \geq n_3 > n_4$.) In this condition an optical beam will be confined in the epitaxial layer 5 between the strips 3. This invention discloses the successful fabrication of a structure of this type. It is a new $p^+n^-n^+$ three-dimensional waveguide fabricated entirely in GaAs which is termed the channel-stop strip guide. The waveguide has an $n^+$ substrate, an $n^-$ epitaxial region for guiding, and $p^+$ regions to laterally confine the light in the epitaxial regions and form channels for light properties. The $p^+$ regions are formed by $Be^+$-ion implantation. The structures exhibit low optical loss ($\alpha$ as low as 0.8 cm$^{-1}$ at 1.06 $\mu$m) and the $p^+n^-$ junctions have sharp high-voltage breakdowns (corresponding to an average electric field in the $n^-$ layer of $1.5 \times 10^5$ V/cm).

The optical waveguide switch is a fundamental component for the development of IOCs. It can be fabricated from a pair of closely spaced waveguides which serve as a directional coupler and which have an electrically conductive layer on the strips 3 and on the back of the substrate 1. The length of the switch is such that with no bias the optical energy incident on one waveguide will be totally coupled to the adjacent waveguide. A reverse-bias voltage across the junction under a strip changes the refractive index under the strip and in the optical channel next to it, to cause switching of the optical energy back to its original waveguide.

The GaAs $p^+n^-n^+$ directional-coupler switch was formed by a pair of closely spaced low-loss ($\alpha \approx 1$ cm$^{-1}$ (4.3 dB/cm) at 1.06 $\mu$m) single-mode $p^+n^-n^+$ channel-stop strip guides. It is operable both as a passive coupler and as an optical switch. The switch is characterized by 17-dB (98%) power isolation in both the switched and unswitched state and by constant total power output (within 0.2 dB) throughout the switching-bias range. This switch performance was found to depend on the crystallographic direction chosen for light propagation.

Since the device operates by dividing power between two channels as a function of reverse bias, it can serve as a modulator or variable power-divider as well as a switch. However, for convenience, the device will hereafter be generally referred to as a switch.

DETAILED DESCRIPTION OF THE INVENTION

Figure 1:
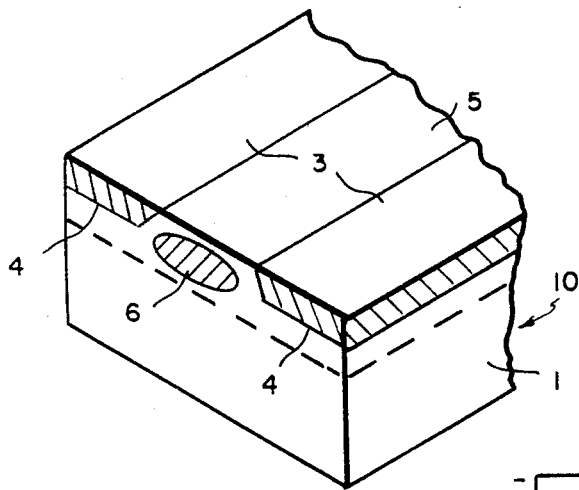
FIG. 1 is a perspective view of the optical waveguide of this invention.

The GaAs channel-stop strip optical waveguide 10 of this invention is shown in a perspective view in FIG. 1. The waveguide 10 was formed by growing an n− epitaxial layer 2, by an $AsCl_3$-$H_2$-Ga vapor-phase epitaxy technique, on a [100]-oriented, $1 \times 10^{18}$ cm$^{-3}$ substrate 1. The n− layer had a concentration of $\sim 1.10^{14}$ cm$^{-3}$ and was about 7 μm thick. Devices were fabricated by first depositing a 700 Å pyrolytic $Si_3N_4$ film at 720° C. over the epitaxial layer 2. A photoresist layer (not shown) of sufficient thickness to stop Be+ ions was than sprayed on the layer 2 and patterned using standard techniques to form an implantation mask in the form of stripe of resist over the guiding strip 5.

The epitaxial layer 2 was then implanted with Be+ ions with successive doses of $1.5 \times 10^{14}$ cm$^{-2}$ at 400 KeV, $1.2 \times 10^{14}$ cm$^{-2}$ at 220 KeV, and $1.2 \times 10^{-14}$ cm$^{-2}$ at 100 KeV to form the p+ strips 3. Following the implant, the photoresist was removed, and the wafer was annealed at 900° C. in flowing nitrogen for 15 min. to activate the Be. Beryllium was chosen because it is the p-type dopant having the maximum penetration depth in GaAs; the multiple doses were chosen to create a heavily doped layer of uniform concentration and thus of uniform refractive index. Evaluation of this implantation technique by a series of etching steps and Hall measurements indicated that the implanted strip layers 3 had a relatively constant p-type concentration of $2 \times 10^{18}$ cm$^{-3}$ to a depth of about 1.5 μm. The actual junction depth was found to be about 2 μm from the surface. Ion implantation has several advantages for this doping task; it provides precise control on the depth and concentration of the implanted layer, and allows the option of selective doping by simple masking techniques. Structures having guiding-strip 5 widths from 20 to 45 μm were fabricated.

This waveguide structure 10 has the advantages of being planar and easier to fabricate than a rib-type waveguide. Furthermore, since the light is guided between the p-regions 3, the channel-stop guide minimizes evanescent-tail losses and has lower attenuation for comparable optical confinement.

The relative magnitude of the indices of refraction of the regions of the waveguide 10 is given by $n_2 > n_3 \geq n_1 > n_4$. In this structure, the effective guide index is largest in the central portion of region 2 (between the strip regions 3 of index $n_3$) and light will be guided there. The strip regions of index $n_3$ thus serve as optical-channel stops.

The mode characteristics of the channel-stop strip guide 10 were calculated and predict single-order-mode propagation of confined light 6 for guiding strip 5 widths less than 35 μm for the epitaxial-layer thicknesses (7 μm) in our device. The observed modes are consistent with these computations. The guiding regions is about 20 μm wide and 7 μm high. The $E_{21}^x$ mode was observed on channel-stop waveguides 10 with 45 μm-wide guiding strips 5.

Transmission measurements on the channel-stop strip guide were made using an end-fire coupling scheme. The TE-polarized radiation from either a cw Nd:YAG laser at 1.06 μm or from a pulsed GaAs-GaAlAs double-heterostructure stripe-geometry laser at 0.920 μm was focused on the cleaved input face of the guide using a microscope objective. The loss coefficients were found by determining the transmission through several lengths ($\lesssim 1$ cm) of the same sample.

Loss measurements on a single-mode waveguide device 10 showed that for a guide stop 5 width of 20 μm, the loss at 1.06 μm is 0.8 cm$^{-1}$ (3.5 dB/cm). This loss for the channel-stop strip guide 10 is believed to be the lowest ever reported for a three-dimensional GaAs waveguide. The loss of 0.920 μm is 1.1 cm$^{-1}$.

The low optical loss, in conjunction with the good electrical characteristics of the p+n− junctions 8, suggests that the optical GaAs channel-stop strip guide 10 is well suited for modulators and switches using electro-optical effects, and would be useful in integrated optic circuits operating at GaAs-laser wavelengths or longer wavelengths.

Figure 2:
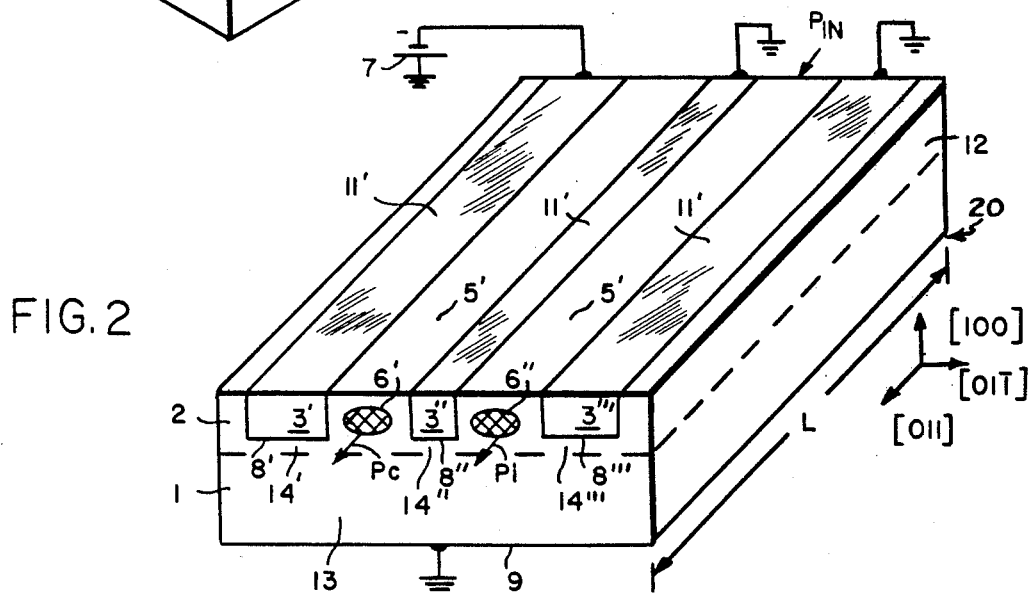
FIG. 2 is a perspective view of the optical waveguide switch of the invention.

A perspective end view of an electrooptic switch 20 using the channel-stop strip optical waveguide is shown in FIG. 2. The switching device 20 has a planar structure and is composed of an n+ substrate 1, an n− guiding layer 2, and three p+ regions 3; two of which, 3' and 3''', lie along the outside edges of the guiding strips or channels 5', 5''; and one 3'' that lies in the space between the guide channels 5', 5''. The p+ regions 3 reduce the effective refractive index outside the channels 5 where the light 6 propagates and thus serve as optical-channel stops. The guides 5 were highly synchronous and the device length L was cleaved to provide one coupling length, the coupling length in that length at which maximum power is transferred to the coupled guide 5' from the light input guide 5'' at zero bias of voltage source 7. The optical switching was achieved by reverse biasing one of the p+n− junctions 8' by applying a negative voltage 7 to region 3'. The applied electric field alters the propagation constant of the coupled guide 5' relative to the input guide 5'' through the electrooptic effect. To achieve optimum switching, the applied bias was adjusted to obtain maximum power output from the input guide 5''.

The fabrication of the switch 20 follows the same steps as for the fabrication of the waveguide 10. The n− guiding layer 2 typically has a concentration of $6.10^{14}$ cm$^{-3}$ which was slightly larger than was used in the waveguide but performance is not substantially affected by the difference. Following the anneal step in the fabrication process, the nitride layer was removed and the sample was coated with 3000 Å of pyrolytic $SiO_2$ (not shown) at 400° C. A large-area back contact 9 of Au:Sn was then plated on the substrate. Contacts 11 to the outside p+ regions 3 (which were 3 mil wide) were formed by plating Au:Sn through etched openings in the $SiO_2$ and then micro-alloying. The p+n− junctions 8 had sharp high-voltage breakdowns at electric fields in the punched-through n− layer of $\sim 1.5 \times 10^5$ V/cm.

The switches were evaluated at 1.06 μm using an end-fire coupling scheme. Radiation $P_{in}$ from a Nd:YAG laser was polarized and focused on the cleaved input face 12 of the device 20 to excite the lowest-order TE mode in guide 5''. The output power of the light 6', 6'' from the cleaved face 13 of guides 5', 5'' was measured to provide the coupled light output power $P_c$ and the direct light output power $P_i$, respectively, as a function of the basis provided by source 7. To evaluate switcing performance, devices were cleaved to a coupling length and the power output vs bias for each channel was recorded using a variable dc voltage source 7 to continuously vary the bias on the switch 20.

Details of the methods of output power measurement are contained in Applied Phys. Lett., Vol. 29, No. 10, Nov. 15, 1976, and are not necessary for a description of this invention.

The attenuation of switch 20 was only about 0.1 dB/cm greater than that of a single guide 5 (fabricated on the same wafers with the switch) having the same dimensions as one of the coupled guides 5. The switches of this invention had a coupling length of 7-8 mm. The attainment of 98% power transfer at zero bias for these lengths indicates that the guides are highly synchronous.

The switch had a [100]-oriented surface, and light propagation was normal to the cleavage planes. It was found that the switching performance was dependent on which crystallographic direction normal to the cleavage plane was chosen for propagation. For a dc electric field E from source 7 in the [100] direction, corresponding to a reverse bias of the $p^+n^-$ junction 8, the electrooptic effect in GaAs results in an incrase in the index along the [011] direction and a decrease in the [01$\bar{1}$] direction. Thus, a TE optical wave propagating in the [011] direction will encounter an index decrease, while a TE wave propagating in the [01$\bar{1}$] direction will encounter an index increase. Since the electrooptic index changes are of the same order of magnitude as the effective guide index difference that maintains the lateral mode confinement, switches fabricated for propagation along these two different directions could be expected to have different performance characteristics.

Figure 3:
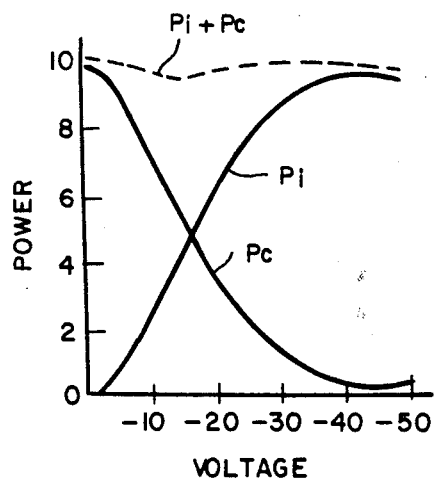
FIG. 3 is a plot of light transmission in the two channels of the switch as a function of voltage applied to the switch.

FIG. 3 shows a typical data for the switch of FIG. 2 oriented for propagation along the [011] direction. For this case, the switch had a length of 7.2 mm ($\simeq$coupling length), the guides were 8 $\mu$m wide with a 4.5 $\mu$m spacing, and the epitaxial layer was 4.8 $\mu$m thick. As shown in FIG. 2, the light $P_{in}$ was incident in the guide 5'' furthest away from the biases $p^+$ region 3'. The power output vs bias from the coupled channel, $P_c$, and from the input channel, $P_i$, are plotted along the total power, $P_c+P_i$. The plot of FIG. 3 has been normalized to the total output power at zero bias. As shown in FIG. 3, 98% power division (17-dB) was achieved at both zero bias and a switching bias of about 43 V. The total power output was constant in both switch states and varied only 0.2 dB throughout the bias range. This data was taken with the outer $p^+$ region 3''' grounded and the middle $p^+$ region 3'' open-circuited. An alternative bias arrangement would have both regions 3'' and 3''' grounded. (When operating the device with region 3''' biased, 3'' open-circuited, and 3' grounded, similar switching behavior was observed; in the switched state, i.e., with bias applied power isolation was only 13 dB and power output decreased by 0.5 dB.).

Figure 4:
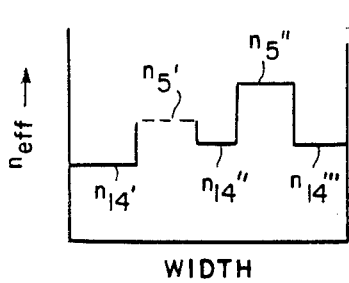
FIGS. 4 and 5 are index profiles of the switch with an applied switching voltage and light propagation in the [011], [01$\bar{1}$] direction, respectively.

FIG. 4 is a schematic representation of the effective-index profile of face 13 of switch 20 (for which the data of FIG. 3 is shown) at an arbitrary negative bias of junction 8'. The two high-index regions $n_{5'}$, $n_{5''}$ represents the effective index in the central guiding regions 5', 5'' and $n_{14}$ represents the effective indices under the junctions 8. Their relative values determine the effectiveness of the lateral confinement of the propagating light. For propagation in a [01$\bar{1}$] direction, reverse biasing the $p^+n^-$ junction 8' lowers the indices $n_{5'}$, $n_{14''}$ as shown and mode confinement is improved. This effect, we believe, results in the constant power output. It is worth mentioning that the zero-bias capacitance of this switch is 35 pF, which gives a calculated RC time constant for the device in a 50-$\Omega$ system of 1.75 nsec. This corresponds to a power-bandwidth ratio for maximum switching of 110 mW/MHz. This should not be an upper performance limit since a reduction of the capacitance by about an order of magnitude could be realized by shrinking the width of the $p^+$ regions 3' and 3'''.

It was found that switching could be obtained with switching biases with some output power loss, in a device oriented for propagation along the [01$\bar{1}$] direction instead of the [011] direction shown in FIG. 2. The switch for demonstrating [01$\bar{1}$] propagation direction had a length of 8.2 mm ($\simeq$coupling length), the guides were 6 $\mu$m wide with a 6 $\mu$m spacing, and a 4.8 $\mu$m thick epitaxial layer. The light $P_{in}$ was incident in the end of guide 5'' at face 12, and bias was applied to the furthest removed junction 8' as shown in FIG. 2. The light was 98% (17 dB) coupled to guide 5' at zero bias and 3 dB switching was achieved at $\sim$20 V. Maximum switching occurred at $\sim$30 V bias, with 97.5% (16 dB) of the total output power emerging from the input guide channel 5''. The total output power decreased about 0.8 dB between 0 and 30 V bias, and continued to fall off gradually at higher biases.

Figure 5:
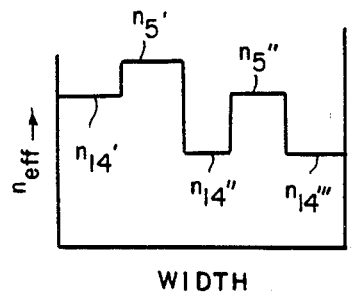

FIG. 5 is a schematic representation of the effective-index profile of the face 13 of the switch 20 for this direction of light propagation at an arbitrary negative bias. For propagation in a [01$\bar{1}$] direction, reverse biasing the $p^+n^-$ junction 8' raises the index $n_{5'}$, as shown. This effectively reduces the mode confinement in guide 5' and leads to the decrease in total output power, $P_1+P_c$. The sketched effective-index profile is only diagrammatic. This is especially true in the left central guiding retion 5' where it is difficult to determine the shape and magnitude of the effective index because of the combined effects of index changes caused by the vertical component of the fringing field and changes induced by the electrooptic index variation directly under the biased $p^+$ region 3'.

The effect of the reduced mode confinement was more evident when the bias was shifted to the $p^+$ region 3''' adjacent to the input guide 5'' and the junctions 8', 8'' are open-circuited. In this case, the $\sim$17 dB switching isolation was still obtained, but the total output power fell off somewhat more rapidly, being 2 dB down at the optimum switching voltage. It is worth noting that in this configuration 19 dB modulation of the power in the coupled guide can be obtained. By grounding the outer $p^+$ region 3' nearest the coupled guide, the switching bias could be reduced so that the above power decrease was limited to $\sim$1 dB. The preferred bias arrangement is to ground both regions 3' and 3''.

It should be noted that a switch can be made on material with other than [100] orientation. It would still be preferable to have cleavage planes perpendicular to the propagation direction to maintain input coupling efficiency.

In summary, GaAs $p^+n^-n^+$ optical waveguides and directional-coupler switches have been fabricated in dimensions which indicate the feasibility of integrating the switches with other components on a GaAs wafer of workable dimensions.

Figure 6:
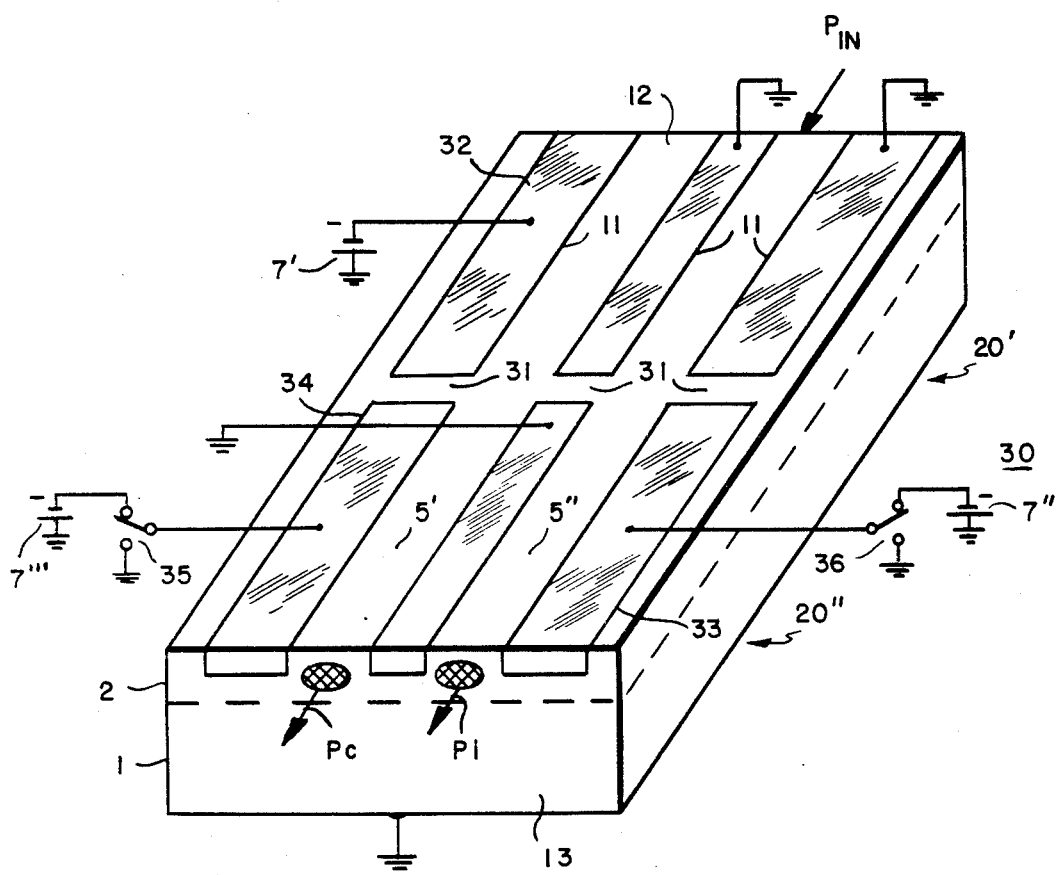
FIG. 6 is a perspective view of a serial connection of switches.

In addition to the directional-coupler switch 20 described above, the channel stop waveguides can be used to fabricate other coupler switch structures such as the directional coupler switch 30 of FIG. 6 with stepped $\Delta\beta$ reversal. (Here, $\Delta\beta$ is the difference in propagation constant between the two guides). This structure, shown in FIG. 6, consists of two directional-coupler switches 20', 20'' in series, which are fabricated on the same substrate 1 and separated by a small space 31 ($\leq 25$ μm). This structure is superior to the conventional switch 20 in that both switch states can be electrically optimized (i.e., there is no exacting requirement that the device length equal a coupling length or that the guide be very highly synchronous). The principle of this device was originally demonstrated using LiNbO$_3$ with a different waveguide structure [Appl. Phys. Lett. 28, 503 (1976)]. Higher power isolation in each switch state is obtainable than for only one switch. Preferred bias arrangements that can be used (refer to FIG. 6) are to reverse bias the junctions under the two diagonally opposed electrodes 32, 33 (switch 36 connected to voltage source 7″) to confine the output light to the coupled guide 5′. Switching to confine the light to the input guide 5″ is obtained by reverse bias of the electrodes 32, 34 (switch 35 connected to voltage source 7‴). For each of these states, better performance is obtained if the remaining four unbiased electrodes are grounded. In principle, a switch could be fabricated with more than the two sections 20′, 20″.

Waveguides, couplers and switches could be fabricated in other materials as long as the structure used maintains the appropriate refractive index profile (discussed in the Summary of Invention section). For instance, other electrooptic semiconductors, such as InP, GaP, InSb could be used. Also, rectifying semiconductor heterojunction structure could be fabricated such as one consisting of Ga$_{1-x}$Al$_x$As, for region 1, GaAs for region 2 and Ga$_{1-y}$Al$_y$As, for region 3 (here $0 < x < 1$ and $0 < y < 1$; the regions could be formed by liquid phase, vapor phase and molecular beam epitaxy). In principle, channel-stop waveguides and devices can be fabricated in many thin film structures (e.g., glass or dielectric crystals). The required index profile could be achieved, for instance, by depositing a film on a lower-index substrate and then forming the channel-stop regions by selective etch and grow techniques, diffusion or implantation.

The device of FIGS. 2 and 6 although described in terms of its switching capability, will also function as a modulator or a variable coupler. This is obvious to those skilled in the art in view of the power dividing characteristics plotted in FIG. 3. The power output $P_i$ from channel 5″ is seen to be a function of the applied reverse bias and thus modulation of the power $P_i$ is obtained by a modulation signal from voltage source 7. Alternatively, the coupled power $P_c$ may be controlled by the magnitude of the voltage of source 7.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A passive planar three dimensional optical waveguide that has a planar structure comprising,
    a semiconductor substrate of one conductivity type of refractive index $n_1$,
    an epitaxial layer of the same conductivity type on said substrate and of refractive index $n_2$,
    the carrier concentration of said epitaxial layer being less than that of said substrate,
    said epitaxial layer having at least two spaced doped stripes of opposite conductivity type and of refractive index $n_3$, said stripes being in but not entirely through said epitaxial layer,
    the carrier concentration of said stripes being greater than that of said epitaxial layer,
    a medium in contact with the surface of said epitaxial layer whose refraction index is $n_4$,
    the magnitude of the refraction indices being $n_2 > n_1$; $n_2 > n_3$; $n_1$, $n_2$, and $n_3$, each $> n_4$,
    the $n_2$ region of said layer between said spaced stripes forming said optical waveguide.

2. The waveguide of claim 1 wherein said medium is air.

3. The waveguide of claim 1 wherein the thickness of the epitaxial layer, the depth of penetration and spacing of the stripes is such that only a single mode will propagate in the waveguide region.

4. The waveguide of claim 1 wherein said epitaxial layer is a high purity layer.

5. The waveguide of claim 4 wherein said epitaxial layer has no added impurities.

6. A passive planar three dimensional optical waveguide that has a planar structure comprising,
    a semiconductor substrate of one conductivity type of refractive index $n_1$,
    an epitaxial layer of the same conductivity type on said substrate and of refractive index $n_2$,
    said epitaxial layer having at least two spaced doped stripes of opposite conductivity type and of refractive index $n_3$, in but not entirely through said layer,
    a medium in contact with the surface of said epitaxial layer whose refraction is $n_4$,
    the magnitude of the refraction indices being $n_2 > n_1$; $n_2 > n_3$; $n_1$, $n_2$, and $n_3$, each $> n_4$,
    the $n_2$ region of said layer between said spaced stripes forming said optical waveguide,
    said medium being an air medium,
    and said substrate and epitaxial layer are n-type GaAs, and said stripes in said epitaxial layer are p-type GaAs.

7. The waveguide of claim 6 wherein the carrier concentration in said substrate is of the order of $1 \times 10^{18}$ cm$^{-3}$,
    the carrier concentration in said epitaxial layer is of the order of $1 \times 10^{14}$ cm$^{-3}$,
    the carrier concentration in said stripes is of the order of $2 \times 10^{18}$ cm$^{-3}$.

8. The waveguide of claim 6 wherein said medium is air.

9. The waveguide of claim 6 wherein the thickness of the epitaxial layer, the depth of penetration and spacing of the stripes is such that only a single mode will propagate in the waveguide region.

10. The waveguide of claim 6 wherein said epitaxial layer is a high purity layer.

11. The waveguide of claim 10 wherein said epitaxial layer has no added impurities.

12. A passive three dimensional optical waveguide that has a planar structure comprising:
    a first doped semiconductor substrate of n-type conductivity of refractive index $n_1$,
    an epitaxial layer of a second semiconductor of the n-type conductivity on said substrate and of refractive index $n_2$, the carrier concentration of said epitaxial layer being less than that of the substrate,
    at least two spaced stripes of a third doped semiconductor of p-type conductivity and of refractive index $n_3$ in but not entirely through said epitaxial layer, the carrier concentration of said third semiconductor being greater than the carrier concentration of said epitaxial layer, a medium in contact with the surface of said epitaxial layer and stripes whose refraction index is $n_4$, the magnitude of the refraction indices being $n_2 > n_1$; $n_2 > n_3$; $n_1$, $n_2$, and $n_3$, each $> n_4$, the $n_2$ region of said layer between said spaced stripes forming said optical waveguide.

13. The waveguide of claim 12 wherein said medium is air.

14. The waveguide of claim 12 wherein said n-type substrate is $Ga_{1-y}Al_yAs$, where $0 < y < 1$, and said epitaxial layer is n-type GaAs, and said p-type stripes are $Ga_{1-x}Al_xAs$, where $0 < x < 1$.

15. The waveguide of claim 12 wherein said medium is air.

16. The waveguide of claim 12 wherein the thickness of the epitaxial layer, the depth of penetration and spacing of the stripes is such that only a single mode will propagate in the waveguide region.

17. The waveguide of claim 12 wherein said epitaxial layer is a high purity layer.

18. The waveguide of claim 17 wherein said epitaxial layer has no added impurities.

19. A passive three dimensional optical waveguide switch that has a planar structure comprising:

a plurality of optically connected said switches, each switch comprising a semiconductor substrate of one conductivity type and of refractive index $n_1$, an epitaxial layer of the same conductivity type on said substrate and of refractive index $n_2$, said epitaxial layer having three spaced doped stripes of opposite conductivity type and of refractive index $n_3$ in but not entirely through said layer, to form two spaced optical guides in said $n_2$ epitaxial layer between said stripes, the surface of said layer and stripes being in contact with a medium of refraction index $n_4$, the magnitude of said refractive indices being related to each other by the relationships $n_2 > n_1$; $n_2 > n_3$; $n_1$, $n_2$, and $n_3$, each $> n_4$, means for making electrical contact to the bottom of said substrate, an electrode film extending along and on at least one outside stripe of said stripes, means for making electrical contact to at least one of the outside stripes, the length of said stripes being such as to couple at least a portion of the optical energy from one guide into the other guide in the absence of a reverse bias voltage across one stripe, and means for applying a reverse bias voltage across at least one of said outside stripes to change the index of refraction under said stripe and in the adjacent guide to change the amount of energy coupled to the other guide, each switch being on the same substrate and epitaxial layer and having their optical guides aligned with each other, the stripes of each switch being separated from the stripes of the adjacent switch.

20. The switch of claim 19 wherein said medium is air.

21. A passive three dimensional optical waveguide switch that has a planar structure comprising:

a doped semiconductor substrate of refractive index $n_1$, an epitaxial layer of the same semiconductor and of the same conductivity type on said substrate and of refractive index $n_2$ said epitaxial layer having three spaced doped stripes of said semiconductor of opposite conductivity type and of refractive index $n_3$ in but not entirely through said layer to form two spaced optical guides in said epitaxial layer between said stripes in said $n_2$ region of the epitaxial layer, the surface of said layer and stripes being in contact with a medium of refraction index $n_4$, the magnitude of said refractive indices being related to each other by the relationships $n_2 > n_1$; $n_2 > n_3$; $n_1$, $n_2$, and $n_3$, each $> n_4$;

means for making electrical contact to the bottom of said substrate, an electrode film extending along and on at least one outside stripe of said stripes, means for making electrical contact to the film on at least one of the outside stripes, the length of said stripes being of such length to couple substantially all the optical energy from one guide into the other guide at zero bias, means for applying a reverse bias voltage across the junction of one of said outside stripes to change the index of refraction under said stripe and in the adjacent guide to change the amount of energy coupled to the other guide.

22. The switch of claim 21 wherein said medium is air.

23. The switch of claim 21 wherein: said substrate and epitaxial layer is n-type GaAs and said stripes in said epitaxial layer are p-type GaAs.

24. The switch of claim 21 wherein said reverse bias voltage is such that substantially all the energy is coupled to one guide.

25. The switch of claim 21 comprising in addition: means for grounding the junction of said stripes to which reverse bias is not applied.

26. A passive three dimensional optical waveguide switch that has a planar structure comprising:

a substrate of a first doped semiconductor of one conductivity type of refractive index $n_1$, an epitaxial layer of a second semiconductor of the same one conductivity type on said substrate and of refractive index $n_2$, three spaced doped stripes of a third semiconductor of opposite conductivity type and of refractive index $n_3$ in but not entirely through said epitaxial layer, to form two spaced optical guides in said $n_2$ epitaxial layer between said stripes, the surface of said layer and stripes being in contact with a medium of refraction index $n_4$, the magnitude of said refractive indices being related to each other by the relationships $n_2 > n_1$; $n_2 > n_3$; $n_1$, $n_2$, and $n_3$, each $> n_4$;

means for making electrical contact to the bottom of said substrate, an electrode film extending along and on at least one outside stripe of said stripes;

means for making electrical contact to at least one of said outside stripes, the length of said stripes being of such length to couple substantially all the optical energy from one guide into the other guide at zero bias, means for applying a reversed bias voltage across the junction of one of said outside stripes to change the index of refraction under said stripe and in the adjacent guide to change the amount of energy coupled to the other guide.

27. The switch of claim 26 wherein said medium is air.

28. The switch of claim 26 wherein said reverse bias voltage is such that substantially all the energy is coupled to one guide.

29. The switch of claim 26 comprising in addition: means for grounding the junction of said stripes to which reverse bias is not applied.

* * * * *